F. M. JONES.
BICYCLE HANGER.
APPLICATION FILED MAR. 30, 1915.
1,251,783.
Patented Jan. 1, 1918.
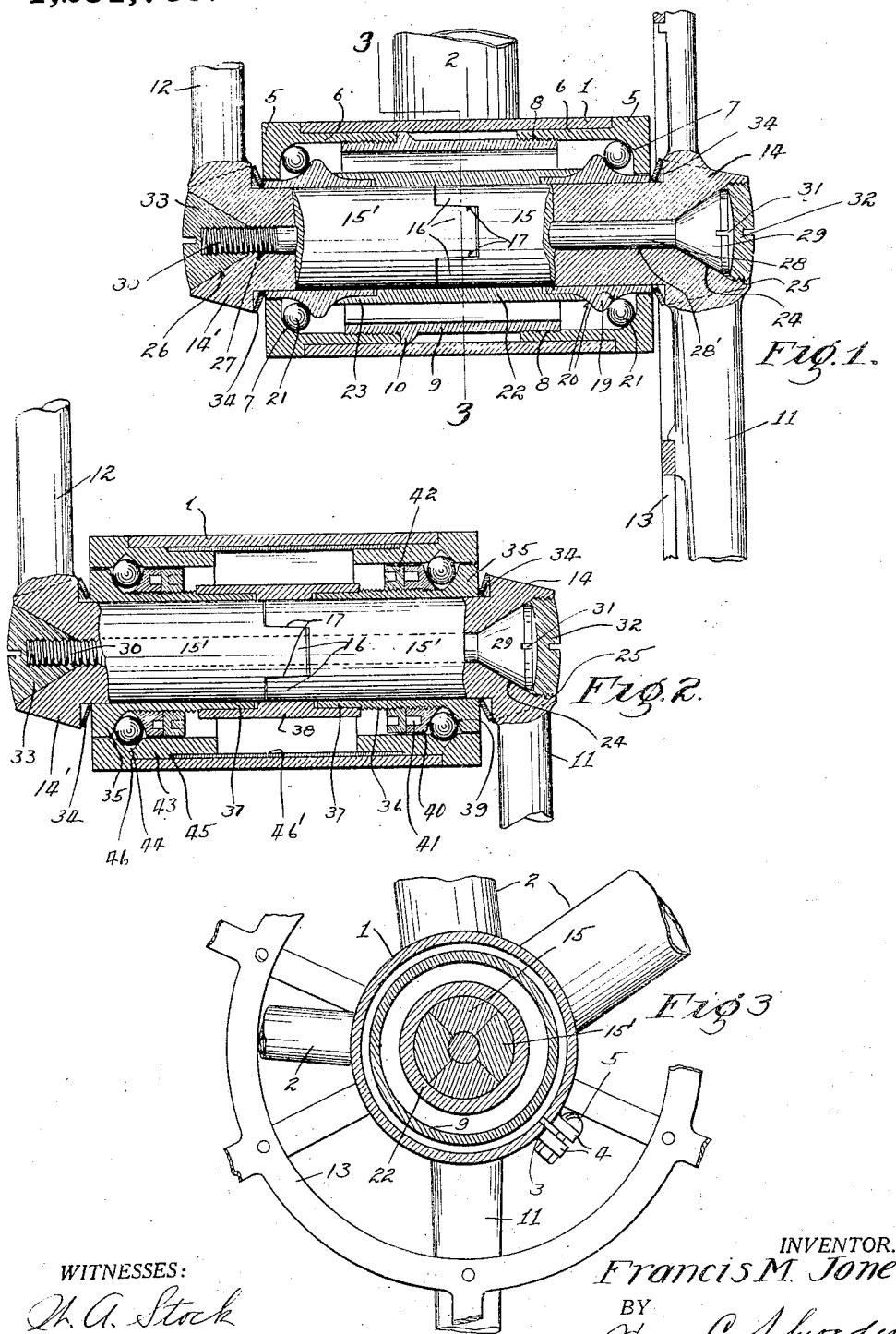
WITNESSES:
INVENTOR.
Francis M. Jones
BY
ATTORNEYS.

UNITED STATES PATENT OFFICE.

FRANCIS M. JONES, OF OAKLAND, CALIFORNIA.

BICYCLE-HANGER.

1,251,783.

Specification of Letters Patent.

Patented Jan. 1, 1918.

Application filed March 30, 1915. Serial No. 17,997.

*To all whom it may concern:*

Be it known that I, FRANCIS M. JONES, a citizen of the United States, residing at Oakland, in the county of Alameda and State of California, have invented certain new and useful Improvements in Bicycle-Hangers, of which the following is a specification.

This invention relates to improvements in crank hangers for bicycles and has for its principal object the construction of a device of this character whereby the cranks are held in a rigid, fixed relation although made in two parts.

Another object of my invention is to provide an improved form of bolt for holding the two parts together and means for locking the said bolt, and Still another object of the invention is to provide improved ball race members capable of being reversed whereby a new rolling surface is presented when the bearing becomes worn.

With these and other objects in view my invention consists in the novel construction, combination and arrangement of parts as herein illustrated and pointed out in the appended claims, from which it will be apparent that I do not restrict myself to the showing made herein but may adopt such variations as fall within the scope of the claims.

Reference being had to the accompanying drawing forming a part of this specification, Figure 1 is a view in longitudinal section through a crank hanger constructed in accordance with my invention.

Fig. 2 is a view in section of a modified form of my improved hanger.

Fig. 3 is a view in section on line 3—3, Fig. 1.

Referring to corresponding parts by the same numerals of reference, 1 denotes the hanger socket connected to the tubular members of the framework 2 in the usual manner. This socket I prefer to construct with a slot 3 along one edge thereof, this slot being provided on each side with lugs 4 adapted to receive a screw or bolt thereby drawing the lugs together. The form of bearing shown in Fig. 1 consists of the members 5 provided with the tubular extension 6 adapted to fit within the hanger socket 1. On the inner surface of these extensions are formed ball race members 7 and on the interior surface of the extension is provided the screw threads 8. This threaded portion is adapted to engage with the threaded portion of a sleeve or cylindrical member 9, the said member being provided with an annular abutment ring 10 against which one of the extensions 6 contacts. The cranks are denoted by 11 and 12, the former having attached thereto a sprocket 13, the cranks being provided with hub 14 and 14' respectively, and the extension shaft 15 and 15' respectively, these shafts extending to the center of the hub where they are provided with coacting clutch teeth 16. The contacting side faces of these teeth are on a slight bevel as illustrated at 17, the depressions being slightly deeper than the corresponding tooth so that the latter has space to be drawn up in case wear takes place.

Fitting over the shaft portions 15 and 15' are sleeves 19, each of these sleeves being provided with a symmetrically disposed ball race member 20 between which and the contiguous race member 7 are disposed the balls 21 either with or without a retaining ring. The sleeves 19 are held in spaced relation by means of a cylindrical member 22, this member having the recessed portion 23 on its ends adapted to fit over the correspondingly reduced portion of the sleeve 19.

The clutch teeth are drawn into contact by a bolt 28 passing through a bore 28' in the extension hubs 15 and 15'. The hub of crank 11 is provided with a conical recess 24, the outer portion of which is screw threaded as at 25. The hub of crank 12 is provided with a conical recess 26, the bore 28' having screw threads 27 adjacent the small end of this recess. The cranks are held together by means of the bolt 28 having on one end the conical head 29 adapted to fit in the recess 24 and on the other end the threaded portion 30 is adapted to engage the corresponding threads 27 on the hub of crank 12. The head 29 is provided with a screw slot 31 by which the bolt is placed in position and the crank shaft drawn together.

To lock this bolt and prevent the hanger from working loose, I provide an exteriorly threaded disk or nut 32, which engages the threads 25 and bears against the outer edge of the head 29 thereby acting as a lock nut, in this manner effectively holding the bolt against turning. On the threaded end of bolt 28 an additional lock is provided and also a finish similar to the opposite side, by means of the conical nut 33, this nut engaging the threads 30 which project within the recess 26.

The sleeves 19 are held in contact with the spacing sleeve and spaced on the crank shaft by means of the washers 34. These washers have a conical shape so that when the hub is assembled the inner edge bears against the outer face of the sleeve 19 while the outer edge rests against the shoulder between hub and shaft. In this manner any variation between the outer surfaces of the two members 10 is taken up by the spring of the washers. Adjustment in this form of bearing is secured by turning one of the members 5 on the screw threads 8, the sleeves 19 being self centering between the ball races 7, the same is maintained by clamping the hanger socket 1 tight upon the extension 6 by means of the balls 5.

In the modified form shown in Fig. 2 the crank shaft is constructed in the exact manner heretofore described, but the bearings are held in place thereon in a different manner. In this form sleeves 35 are provided which fit closely on the hanger shaft 15 and are centered thereon by means of the conical washers 34. Each of these sleeves are provided with a reduced portion 36, which is exteriorly threaded and a further reduced portion 37 leaving the shoulder between the latter and the threaded portion 36. Interposed between this shoulder on two members is a sleeve 38 whereby the two members 35 are held in spaced relation. The hub end of members 35 are provided with ball race members 39 and on threaded portion 36 are rings 40 provided with a similar and symmetrically disposed race member. Each ring has holes 41 by which the same is turned through a suitable wrench and is locked in position by means of lock ring 42 similarly provided with wrench openings. Outside of member 35 and fitting around the same is member 43 having the race member 44 giving two points of contact. These members are shouldered as at 45 and 46, the former serving as a stop for the sleeve 46' whereas the latter furnishes an abutment for the hanger socket 1.

From the above description it will be apparent that I have provided a device which effectively accomplishes the objects set forth at the beginning of the specification as by the use of the inclined faced jaw clutch coupled with the manner of holding the same in contact, there is formed a crank hanger, the two sides of which are rigidly connected together and yet capable of adjustment if wear takes place.

Also the manner of adjusting the bearings is such that the pressure on all ball races is equal and the adjustment once made is effectively held.

What I claim as new and wish to cover by Letters Patent is:—

1. A crank hanger comprising a socket having an axial slit, ball race members held in said socket and adapted to be clamped against rotation, a sleeve in threaded engagement with the inner end of the race members whereby said race members are held in adjustable spaced relation, a pair of cranks having shafts revolubly mounted in said socket, ball race members carried by said shafts and coacting with the ball race members held on said socket, a sleeve surrounding said crank shafts and holding said last mentioned race members in spaced relation, intermeshing clutch teeth formed on the inner ends of said crank shafts, a flanged hub on the outer ends of said crank shaft, and a spring washer abutting against said flange and said ball races on said crank shafts.

2. A crank hanger comprising, a hanger socket, a pair of ball race members adapted to be clamped in said socket, a two piece crank shaft having enlarged hubs on the outer ends, a pair of ball race members carried by said shaft, sleeves coacting with each of said pairs of ball race members to hold the same in spaced relation, one of said sleeves being in threaded engagement with one of said pairs of ball race members, annular washers having faces inclined to their axis interposed between said enlarged hubs and the ball race members on said shafts and means for drawing said shafts together and thereby also clamping said last mentioned pair of ball race members.

3. A crank hanger comprising a socket, ball race members adjustably held therein, a pair of cranks having shafts extending into said socket, said shafts having complementary interengaged clutch teeth on their contiguous ends, ball race members carried by said shafts and coöperating with the race members of said socket, a headed bolt extending longitudinally through said shafts, a nut engaging said bolt, said cranks having recesses to receive said nut and the head of said bolt, and a locking device in one of said recesses engaging the head of the bolt.

4. A crank hanger comprising a socket, ball race members adjustably held therein, a pair of cranks having shafts extending into said socket, said shafts having complemental interengaged ends, said cranks having conical recesses therein, ball race members carried by said shafts and coöperating with the race members of said socket, a bolt passed longitudinally through said shafts and having a conical head fitting in the recess in one of the cranks, a conical nut within the recess of the other crank and engaging said bolt, and a locking device working in the recess containing said head and engaging the head to prevent rotation of the bolt.

In testimony whereof I affix my signature in presence of two witnesses.

FRANCIS M. JONES.

Witnesses:
W. A. STOCK,
R. M. OYARZO.